United States Patent [19]
Takada et al.

[11] 3,741,089
[45] June 26, 1973

[54] DEVICE FOR OPERATING MAIN SWITCH OF EXPOSURE INDICATING CIRCUIT IN CAMERA

[75] Inventors: Yoshiro Takada, Otokuni; Maki Yamashita, Osaka, both of Japan

[73] Assignee: Minolta Camera Kabushiki Kaisha, Osaka, Japan

[22] Filed: Dec. 9, 1971

[21] Appl. No.: 206,297

[52] U.S. Cl. ............... 95/10 C, 95/11 R, 95/64 R, 250/229
[51] Int. Cl. ........ G03b 7/02, G03b 7/12, G01j 1/42
[58] Field of Search .......... 95/10 C, 10 CE, 10 CT, 95/11 R, 11 L, 53 R, 64 R; 250/215, 216, 229, 237

[56] References Cited
UNITED STATES PATENTS
3,234,867  2/1966  Sho et al. ..................... 95/10 C X
3,307,460  3/1967  Land .............................. 95/10 CE
3,599,548  8/1971  Hennig ........................... 95/11 R
3,436,158  4/1968  Schmitt .......................... 95/10 CE
3,620,142  11/1971  Englesmann et al. ............ 95/10 CE Primary Examiner—Joseph F. Peters, Jr.
Attorney—Stanley Wolder

[57] ABSTRACT

A detecting member for detecting that an exposure control member is in operation keeps the main switch of an exposure indicating circuit closed to energize the indicating circuit while the amount of exposure is being controlled. Upon completion of exposure control, the detecting member opens the switch to de-energize the indicating circuit independently of the action of the shutter.

7 Claims, 4 Drawing Figures

PATENTED JUN 26 1973 3,741,089

INVENTOR
YOSHIRO TAKADA
MAKI YAMASHITA

BY
ATTORNEY

DEVICE FOR OPERATING MAIN SWITCH OF EXPOSURE INDICATING CIRCUIT IN CAMERA

BACKGROUND OF THE INVENTION

The present invention relates to a device for operating the main switch of an exposure indicating circuit for electrically actuating an indicating member in a camera such as the pointer of exposure meter or an indicating lamp for giving a warning of overexposure or underexposure.

Various devices have heretofore been proposed for operating the main switch of exposure indicating circuit of this type. For instance, a device is known by which when a photograph is to be taken a main switch operating member is operated to close the switch and an exposure control member such as a diaphragm ring or shutter speed dial is thereafter operated to determine a proper exposure value in accordance with the indication of an indicating member operated by the foregoing indicating circuit, the main switch being adapted to be opened by the action of the shutter actuating mechanism.

With such device, however, the main switch has to be closed and opened independently of the operation of the exposure control member such as diaphragm ring, this rendering the camera troublesome to operate and impairing high speed photographing operation of the camera. Further it is frequently experienced that if the user should incidentally discontinue the photographing procedure after closing the main switch in preparation for taking a photograph and should then forget to turn off the main switch, the power supplied from the power source to the indicating circuit will be wasted since the main switch will not be opened unless the shutter is actuated.

Another device is disclosed by E.H. Land in his U.S. Pat. No. 3,315,579 wherein rotation of a diaphragm control knob slidably mounted on a shutter operating shaft drives a diaphragm control cylinder cam through the shaft to adjust the diaphragm and a slight depression of the knob during the diaphragm adjusting procedure closes a switch to light a viewing lamp. The lamp is extinguished when the switch is opened by returning the knob upward or by returning the knob together with the shutter operating shaft after the shutter has been operated.

Since the knob on the shutter operating shaft is grasped by the fingers to rotate the shutter operating shaft together with the knob, the operating shaft and the knob have to be projected from the upper face of the camera body a great amount. This impairs the portability of the camera. The device is further disadvantageous in that the knob is complex in its construction and the shutter operating shaft per se must have a special construction because of the necessity for the knob to undergo elastic deformation when grasped so as to enable both the knob and shaft to rotate together and because the knob is adapted to be moved down along with the shutter operating shaft when the shaft is depressed.

Thus the conventional devices of the type described are all associated with the shutter operating mechanism with the inevitable result of complex shutter operating mechanism.

SUMMARY OF THE INVENTION

An object of the present invention is to provide a device which keeps the main switch of an exposure indicating circuit closed only while an exposure control member such as diaphragm ring is being operated in operative relation to the operation of the control member and which opens the switch upon completion of the operation of the control member, the device thus being capable of closing and opening the switch at least completely independently of the action of the shutter.

Another object of this invention is to provide a device for operating the main switch in operative relation to the exposure control member with a simple construction.

The present invention is characterized in that the exposure control member is provided with a detecting member for detecting that the finger of the operator is in contact with the control member when an amount of exposure is to be determined so that the main switch of an exposure indicating circuit is turned on and off by the operation of the detecting member.

The detecting member comprises mechanical means such as a lever which is pushed by the finger of the operator to close the main switch when the finger comes into contact with the exposure control member and which is returned to open the switch when the finger is released from the control member. The lever has a smooth-surfaced driven piece to be pushed by the finger of the operator which is disposed close to the side of the control member and which is normally projected beyond the outer periphery of the control member.

In accordance with the present invention, the main switch of the exposure indicating circuit is closed to indicate whether or not the amount of exposure is proper only while the exposure control member is being operated, namely only during the time necessary for exposure control, and is kept open during the rest of the time, so that waste of power is completely avoided. Since the switch is closed and opened simultaneously with the exposure control, rapid photographing operation will not be impaired, while the above-mentioned lever which projects only slightly beyond the exposure control member does not cause any trouble in handling the camera but assures the desired operation with a simplified construction. The closing and opening of the switch effected independently of the action of the shutter does not require any spectal shutter actuating mechanism.

Other objects and features of this invention will become more apparent from the following description with reference to an embodiment of the invention.

DESCRIPTION OF THE PREFERRED EMBODIMENT

Figure 1:
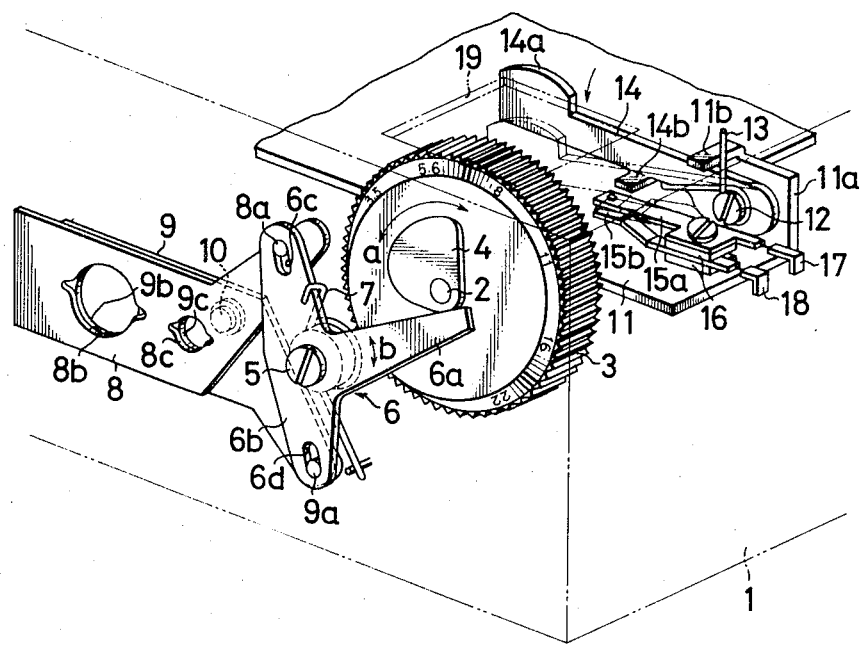
FIG. 1 is a perspective view showing the principal part of an embodiment of this invention.

Referring to FIG. 1, part of the camera body 1 is schematically shown. At the exposure adjusting portion of the camera body 1, an exposure control member 3 is supported on a shaft 2, with part of the control member exposed from the upper face of the body 1 for an exposure controlling operation.

The exposure control member 3 is integrally formed on its side face with a cam 4. A diaphragm lever 6 pivoted to the camera body 1 as at 5 has an arm 6a urged by a spring 7 into sliding contact with the peripheral surface of the cam 4.

The diaphragm lever 6 has an actuating arm 6b formed at its opposite ends with slots 6c and 6d receiving therein pins 8a and 9a projecting from the ends of diaphragm blades 8 and 9 respectively.

The diaphragm blades 8 and 9 have diaphragm apertures 8b and 9b positioned in the light path of a main lens (not shown) and openings 8c and 9c positioned in the path of light impinging on a photocell 10. The diaphragm blades 8 and 9 are slidable on the camera body 1 in a horizontal direction as seen in FIG. 1.

More specifically, when the exposure control member 3 is rotated in the directions of arrow a in the drawing, the cam 4 moves the diaphragm lever 6 in the directions of arrow b to slide the diaphragm blades 8 and 9 in directions opposite to each other, whereby the jusaposed diaphragm apertures 8b and 9b are shifted for the control of exposure and, at the same time, the jusaposed openings 8c and 9c are shifted to vary the light receiving area of the photocell 10 proportionally to the amount of exposure.

Figure 4:
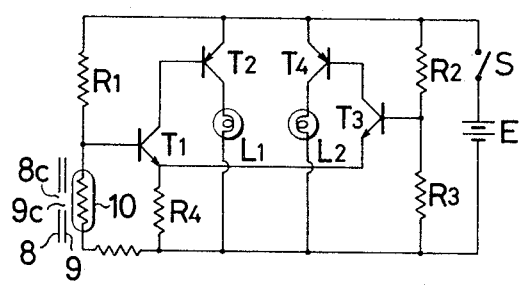
FIG. 4 is a diagram showing an example of an exposure indicating circuit.

An exposure indicating circuit which functions in response to the amount of light received by the photocell 10 comprises, as shown in FIG. 4, resistors $R_1$, $R_2$, $R_3$, $R_4$, the photocell 10, transistors $T_1$, $T_2$, $T_3$, $T_4$ and indicating lamps $L_1$, $L_2$ to be turned on and off by the on-off action of the transistors $T_2$, $T_4$. When the circuit is loaded with the voltage of a power source E by closing a main switch S, the lamp $L_1$ is lighted if the amount of exposure is insufficient, whereas in an event of overexposure the lamp $L_1$ is off and the lamp $L_2$ is turned on. If the amount of exposure is proper, both lamps $L_1$ and $L_2$ are lighted at the same time.

To turn the main switch S on and off, a lever 14 is pivoted at its one end to an upright portion 11a of mounting plate 11 of the camera body as at 12 and is urged by a spring 13 in a counterclockwise direction in FIG. 1. The distal end of the lever 14 has a smoothly curved upper face to provide a driven piece 14a positioned close to the side of the exposure control member 3. A stopper 11b formed on the upright portion 11a determines the position of the lever 14 so that the driven piece 14a is projected suitably above the control member 3.

The lever 14 is further formed with a projection 14b, under which a contact member 15a of the main switch S is located. The contact members 15a and 15b of the main switch S are secured to the mounting plate 11, with insulating members 16 interposed therebetween, and are connected to the exposure indicating circuit by lead members 17 and 18. FIG. 1 further shows a window 19 for permitting part of the exposure control member 3 and the driven piece 14a of the lever 14 to project from the upper face of the body 1.

Figure 2:
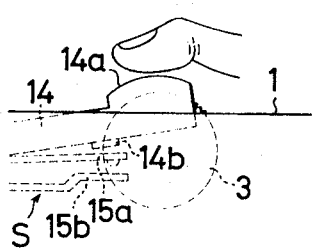
FIGS. 2 and 3 are views illustrating the operation of the embodiment of FIG. 1.
Figure 3:
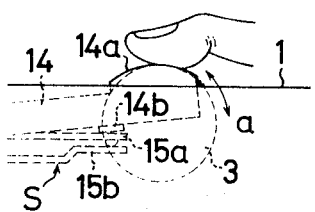

When the finger is placed on the exposure control member 3 for the control of exposure, the driven piece 14a of the lever 14 projecting as seen in FIG. 2 beside the control member 3 is depressed by the finger, causing the projection 14b to push down the contact member 15a into contact with the contact member 15b as shown in FIG. 3. The main switch S is therefore closed to energize the exposure indicating circuit.

Even if the exposure control member 3 is rotated in the directions of arrow a in FIG. 3, the lever 14 remains depressed by the finger and keeps the main switch closed, permitting the exposure indicating circuit to function free of trouble for the control of exposure in accordance with its indication.

When the finger is released from the exposure control member 3 upon completion of exposure control, the lever 14 is returned under the action of the spring 13, freeing the contact member 15a from depression to open the main switch S. In this way, the lever 14 acts as a detecting member for detecting that the exposure control member 3 is being operated.

Although the foregoing embodiment employs the diaphragm control member as exposure control member 3, it will be apparent from the above description that a shutter speed control dial may likewise serve as the exposure control member, with the detecting member provided therefor to turn on and off the main switch.

With a camera including a plurality of operating members for exposure control, the detecting member may be so provided as to detect the operation of a control member which is finally operated for the control of exposure.

This invention can of course be practiced with an exposure control member which is not of the rotary type as in the embodiment described, for example with a slidable control member. Furthermore the detecting members of various constructions can also be used.

In brief, various modifications can be made within the scope of this invention without departing from the principle of this invention.

What is claimed is:

1. A light measuring mechanism in a camera comprising:
   a light measuring system including a photocell exposed to incident light;
   means including a knob rotatable about a longitudinal axis for adjusting a parameter of said light measuring system;
   a current source for energizing said light measuring system;
   means including a normally open switch for connecting said light measuring system to said current source; and
   a switch actuating member positioned proximate said knob and being transversely movable by a finger relative to said longitudinal axis between a depressed position closing said switch to energize said light measuring system and simultaneously render said knob operable by said finger and a retracted position effecting the opening of said switch whereby said switch actuating member is depressed and retracted simultaneously with the engagement and disengagement of said knob by said finger for adjustment of said knob.

2. The mechanism of claim 1 wherein said light measuring system includes an adjustable diaphragm disposed forwardly of said photocell and responsive to the rotation of said knob.

3. The mechanism of claim 2 wherein said switch actuating member includes a finger piece projecting transversely beyond the outer periphery of said knob when said switch actuating member is in its retracted position.

4. The mechanism of claim 3 wherein said finger piece includes a curved convex outer edge.

5. The mechanism of claim 3 including spring means urging said switch actuating member to its retracted position.

6. In a camera including a body, an exposure measuring system including a photocell for indicating a proper exposure value in response to the amount of light received by said photocell, a rotatable exposure control member, a portion of the outer circumference of said exposure control member projecting from the camera body and being rotatably manipulatable by one finger; a spring raised depressible lever member with a free end portion which is disposed close to said projecting portion of said exposure control member; and is depressed by said one finger during manipulation of said control member and means for energizing said network including a normally open switch which is closed by the depression of said lever member to energize said network and is released to open position upon release of said lever to deenergize said network.

7. The device as set forth in claim 6 wherein the other end of said lever member is pivoted in said camera body, and said lever free end portion is spring biased so as to be positioned higher than said outer circumference of said exposure control member when said free end portion is retracted from its depressed position.

* * * * *

UNITED STATES PATENT OFFICE
CERTIFICATE OF CORRECTION

Patent No. 3,741,089  Dated June 26, 1973

Inventor(s) YOSHIRO TAKADA ET AL.

It is certified that error appears in the above-identified patent and that said Letters Patent are hereby corrected as shown below:

-- 30  Foreign Application Priority Data

Japan  December 15, 1970............45-126313 --

Signed and sealed this 22nd day of January 1974.

(SEAL)
Attest:

EDWARD M. FLETCHER, JR.　　　　RENE D. TEGTMEYER
Attesting Officer　　　　　　　　Acting Commissioner of Patents